(12) United States Patent
Dombowsky et al.

(10) Patent No.: US 12,392,130 B2
(45) Date of Patent: Aug. 19, 2025

(54) SYSTEMS AND METHODS FOR COUPLING PREFABRICATED PANELS TO STRUCTURES

(71) Applicant: NEXIICAN HOLDINGS INC., Dallas, TX (US)

(72) Inventors: Braden L. Dombowsky, Peachland (CA); James I. Wilson, Calgary (CA); Graeme G. Barkway, Moose Jaw (CA)

(73) Assignee: Nexiican Holdings Inc., Dallas, TX (US)

( * ) Notice: Subject to any disclaimer, the term of this patent is extended or adjusted under 35 U.S.C. 154(b) by 10 days.

(21) Appl. No.: 18/095,918

(22) Filed: Jan. 11, 2023

(65) Prior Publication Data

US 2023/0220662 A1    Jul. 13, 2023

Related U.S. Application Data

(60) Provisional application No. 63/298,933, filed on Jan. 12, 2022.

(51) Int. Cl.
*E04B 2/30* (2006.01)
*E04B 1/38* (2006.01)
*E04B 1/14* (2006.01)

(52) U.S. Cl.
CPC ............ *E04B 1/388* (2023.08); *E04B 1/14* (2013.01)

(58) Field of Classification Search
CPC .............. F16B 2/10; E04B 1/388; E04B 1/14
See application file for complete search history.

(56) References Cited

U.S. PATENT DOCUMENTS

| | | | | |
|---|---|---|---|---|
| 3,469,810 A | * | 9/1969 | Dorris | F16B 2/12 |
| | | | | 248/245 |
| 5,131,780 A | * | 7/1992 | Love | B25B 5/101 |
| | | | | 24/522 |
| 5,586,373 A | * | 12/1996 | Eby | B25B 1/103 |
| | | | | 296/167 |
| 7,469,903 B2 | * | 12/2008 | Marshall | F41J 1/10 |
| | | | | 24/514 |
| 7,997,839 B1 | * | 8/2011 | Gallegos | B60R 7/08 |
| | | | | 410/102 |
| 9,896,849 B1 | * | 2/2018 | Aboukhalil | E04F 13/0803 |
| 10,295,116 B2 | * | 5/2019 | Munro | F16B 2/12 |
| 10,428,517 B1 | * | 10/2019 | Starks, Jr. | E04B 1/388 |
| 2016/0138634 A1 | * | 5/2016 | Zhang | E04B 1/5812 |
| | | | | 52/698 |
| 2017/0356181 A1 | * | 12/2017 | Krause | E04B 1/388 |

(Continued)

*Primary Examiner* — Basil S Katcheves
(74) *Attorney, Agent, or Firm* — Carter, DeLuca & Farrell LLP

(57) ABSTRACT

Example embodiments provide systems and methods for coupling prefabricated panels to a structure. One example system provides a system for coupling a prefabricated panel to a structure. The system may comprise a first member. The first member may be couplable to a framing structure of the prefabricated panel. The system may also comprise a second member. The second member may pivot relative to the first member. The system may also comprise a fastener. The fastener may be configured to bias the first and second members together such that a component of the structure is at least partially receivable between the first and second members and tightening the fastener reduces a distance between the first and second members.

30 Claims, 13 Drawing Sheets

(56) References Cited

U.S. PATENT DOCUMENTS

| | | | | |
|---|---|---|---|---|
| 2018/0135301 A1* | 5/2018 | Hasse | .................... | E04B 1/388 |
| 2018/0347178 A1* | 12/2018 | Heady | ................ | E04G 23/0229 |
| 2019/0153733 A1* | 5/2019 | Krause | ................ | E04B 1/7654 |
| 2019/0309514 A1* | 10/2019 | Stahl, Jr. | ................ | E04B 2/965 |
| 2020/0224408 A1* | 7/2020 | Thrift | .................... | F16B 5/123 |
| 2020/0240138 A1* | 7/2020 | Ouimette | ................ | E04B 1/665 |
| 2021/0114743 A1* | 4/2021 | Boswell | ................ | B64D 41/00 |
| 2022/0195735 A1* | 6/2022 | Ochi | .................... | E04F 13/0805 |
| 2024/0084581 A1* | 3/2024 | Amini | .................... | E04B 1/388 |

* cited by examiner

SYSTEMS AND METHODS FOR COUPLING PREFABRICATED PANELS TO STRUCTURES

CROSS-REFERENCE TO RELATED APPLICATIONS

This application claims the benefit under 35 U.S.C. § 119 of U.S. application No. 63/298,933 filed 12 Jan. 2022 and entitled SYSTEMS AND METHODS FOR COUPLING PREFABRICATED PANELS TO STRUCTURES which is hereby incorporated herein by reference for all purposes.

FIELD

This invention relates to systems and methods for coupling prefabricated panels to structures. Example embodiments provide coupling mechanisms and methods for clamping prefabricated panels onto or to structures.

BACKGROUND

Constructing a building is typically an extensive project involving significant amounts of time and/or resources (labour, energy, materials, etc.). Moreover, the carbon footprint of a building built using existing systems and methods can be large.

Reducing the amount of time and/or resources required to construct a building can be desirable. Reducing the carbon footprint of a building can also be desirable. With more environmentally stringent building codes being passed regularly, reducing the amount of resources used to construct a building and the carbon footprint of the building is increasingly becoming a requirement to be in compliance with new building codes.

One way the amount of time and/or resources required can be reduced is by constructing the building using prefabricated panels. However, such prefabricated panels typically need to be coupled to a structure once the prefabricated panels are delivered to the installation site. Coupling the prefabricated panels to the structure typically requires precise alignment of corresponding coupling bores, connectors, etc. For such precise alignment to be possible, individual components may need to be manufactured with extreme precision. Additionally, or alternatively, weld connections may not be sufficiently precise. Misalignments that occur may significantly delay a project.

There remains a need for practical and cost effective ways to couple prefabricated building panels to structures.

SUMMARY

This invention has a number of aspects. These include, without limitation:
 coupling systems;
 systems and methods for coupling prefabricated panels to structures.

Further aspects and example embodiments are illustrated in the accompanying drawings and/or described in the following description.

BRIEF DESCRIPTION OF THE DRAWINGS

The accompanying drawings illustrate non-limiting example embodiments of the invention.

DETAILED DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive sense.

Aspects of the technology described herein provide systems and methods for coupling prefabricated panels to structures.

Figure 1A:
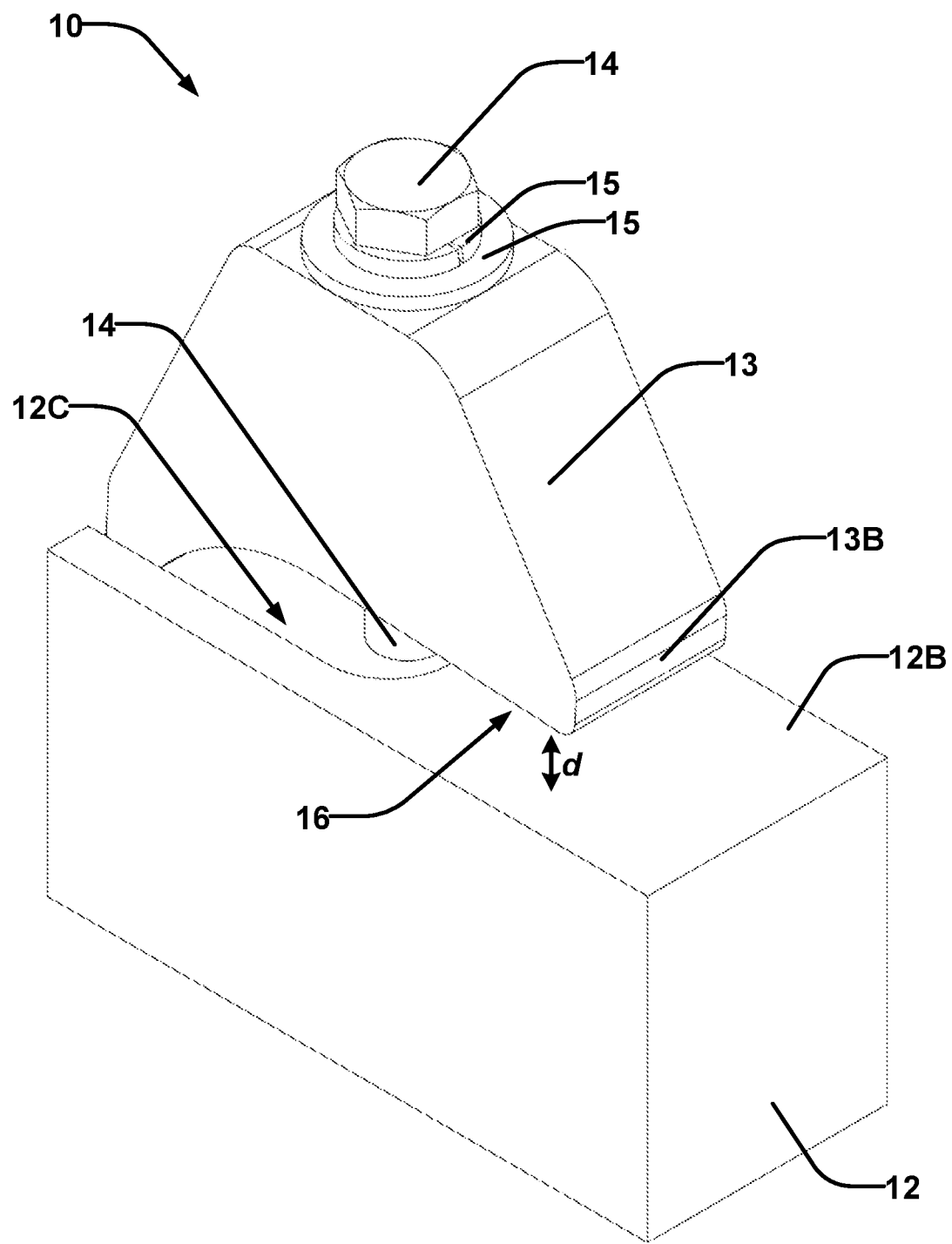
FIG. 1A is a perspective view of a coupling mechanism according to an example embodiment of the technology described herein.

FIG. 1A is a perspective view illustrating an example coupling mechanism 10. Coupling mechanism 10 may, for example, couple a prefabricated panel to a component of a structure. The structural component may, for example, comprise an I-beam, an anchor plate, a flange (e.g. a flange of a steel profile), an angle bar, a plate extending from a structure, a lip and/or the like.

Coupling mechanism 10 comprises a first member 12 and a second member 13.

First member 12 may be coupled to a framing structure of a prefabricated panel such as a Structural Insulated Panel (SIP). First member 12 may, for example, be welded, adhered, fastened, etc. to the framing structure of the prefabricated panel. In some embodiments first member 12 is machined, formed, etc. into an existing member of the framing structure of the prefabricated panel. In some embodiments first member 12 is embedded within the prefabricated panel. In some embodiments first member 12 is at least partially embedded into concrete, a cementitious material and/or the like. In some such embodiments one or more reinforcing members (e.g. reinforcing mesh, reinforcing fibers, re-bar, etc.) may at least partially secure first member 12 within the concrete, cementitious material, etc.

Second member 13 is typically separate from first member 12.

First and second members 12, 13 may be biased together with a fastener 14. In some such embodiments second member 13 may pivot relative to first member 12. Fastener 14 may pass through a bore 13A extending through second member 13 and be inserted into a bore 12A which at least partially extends through first member 12. Bore 12A may comprise threads which correspond to threads of fastener 14. Bore 13A may optionally also at least partially comprise threads which correspond to threads of fastener 14; however, in currently preferred embodiments bore 13 does not comprise threads. In some embodiments fastener 14 is a self-tapping fastener (e.g. may at least partially tap its own threads and/or bore). Additionally, or alternatively, bore 13A may optionally have a larger diameter than fastener 14 to facilitate vertical ("vertical" as oriented in FIG. 1B) pivoting of second member 13 relative to first member 12.

In some embodiments bore 13A comprises plural diameters. For example, a first portion 13A-1 of bore 13A may comprise a first diameter. The first diameter may be similar to the diameter of fastener 14. Bore 13A may also comprise a second portion 13A-2 having a second diameter that is larger than the first diameter (see e.g. FIG. 1B). Bore 13A having plural diameters may facilitate vertical ("vertical" as oriented in FIG. 1B) pivoting of second member 13 relative to first member 12. In some embodiments at least one diameter of bore 13A is at least about 10-25% larger than the diameter of fastener 14.

In some embodiments a plurality of fasteners 14 bias first and second members 12, 13 together.

In some embodiments one or more spacers or washers 15 are positioned between a head of fastener 14 and second member 13. If plural spacers or washers 15 are used, some of spacers or washers 15 may be different than other ones of spacers or washers 15. In some embodiments spacers or washers 15 comprise at least one split washer. The split washer may distribute a load from a head of faster 14 onto second member 13. Additionally, or alternatively, the split washer may at least partially lock (e.g. frictionally lock) fastener 14 relative to first and/or second members 12, 13 or other spacers or washers 15. Locking fastener 14 relative to first and/or second members 12, 13 or other spacers or washer 15 may, for example, at least partially prevent inadvertent unwinding or loosening of fastener 14 once coupling mechanism 10 is installed.

Figure 1B:
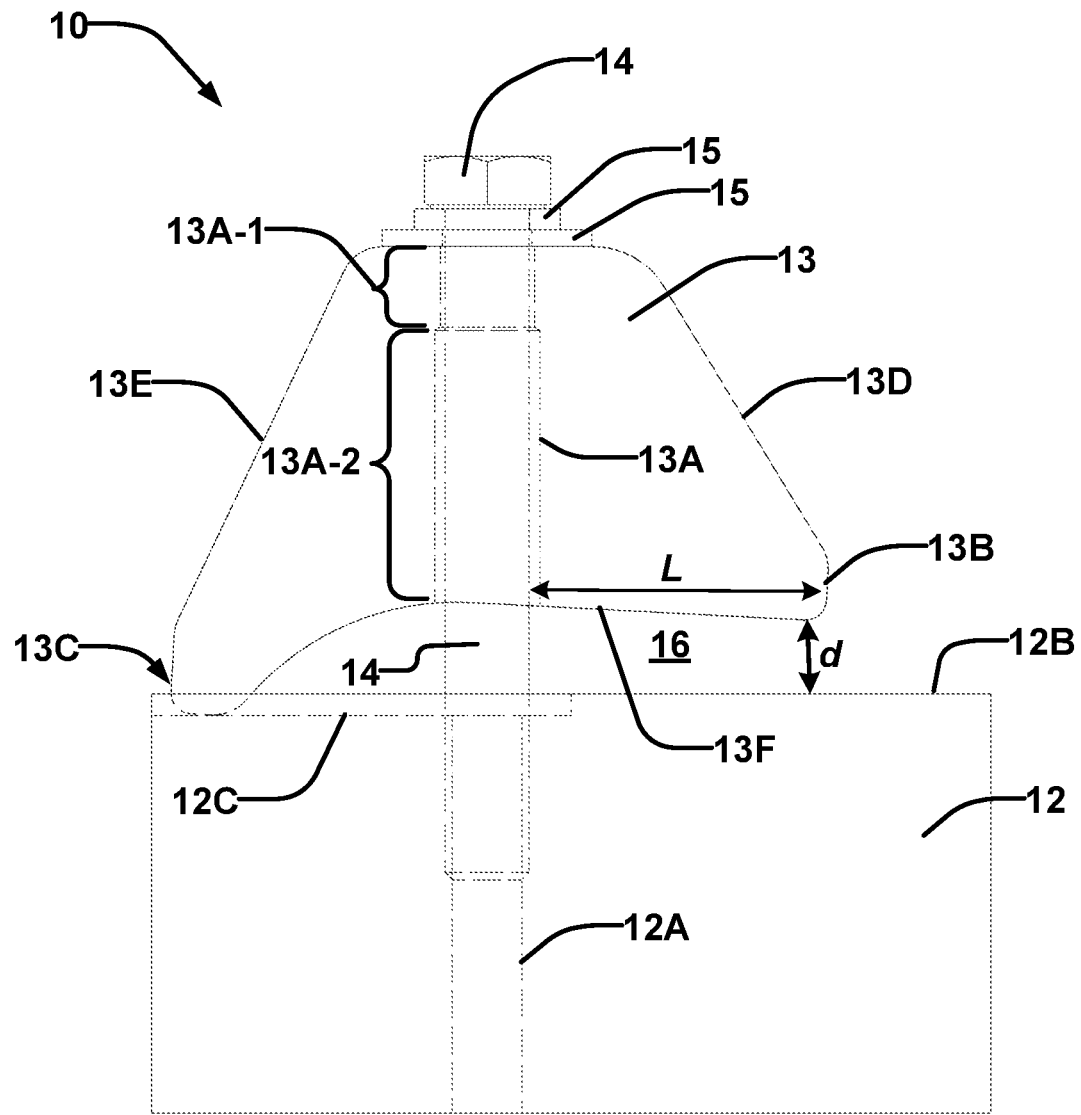
FIG. 1B is a front view of the coupling mechanism of FIG. 1A.

FIG. 1B is a front view of the example coupling mechanism 10 illustrating first and second members 12, 13 biased together with fastener 14.

A component of a structure (e.g. an I-beam, an anchor plate, etc. as described elsewhere herein) may at least partially be positioned in a cavity 16 between first member 12 and second member 13. Tightening fastener 14 reduces a distance d between first member 12 and second member 13. Fastener 14 may be sufficiently tightened such that the component of the structure is effectively clamped between first and second members 12, 13 and cannot move relative to first and second members 12, 13 thereby coupling the prefabricated panel that first member 12 is coupled to (or is a part of) to the component of the structure (and the structure generally). In some embodiments tightening fastener 14 reduces a distance d between first member 12 and an end 13B of second member 13.

In some embodiments the clamping force exerted on the structural component coupled between first member 12 and second member 13 is about 5 to about 35 kN. In some embodiments the clamping force exerted on the structural component coupled between first member 12 and second member 13 is about 25 kN.

Having first and second members 12 and 13 clamp onto the component of a structure advantageously facilitates rapid coupling of prefabricated panels to one or more structures. Advantageously, precise alignment of components of prefabricated panels with corresponding components of the structure (e.g. precise alignment of corresponding bores, connectors, etc.) is not required. First and second members 12, 13 may easily and rapidly squeeze or clamp a component of a structure which is placed between first and second members 12, 13. In some embodiments first and second members 12, 13 frictionally engage the component of the structure.

In some embodiments about 15-45% of one or both of an upper surface of first member 12 (e.g. surface 12B) and a lower surface of second member 13 (e.g. surface 13F) engage a component of a structure.

It may be desirable to permit movement of a clamped component of a structure relative to one or both of first and second members 12, 13. For example, it may be desirable to permit movement of a prefabricated panel relative to the structure during seismic activity. In some embodiments first and second members 12 and 13 may at least partially slipingly engage (or clamp) the component of the structure permitting movement of the component of the structure relative to one or both of first and second members 12, 13 up to a threshold amount (e.g. an amount that safely dissipates seismic forces, shear forces and/or the like).

In some embodiments one or both surfaces of first and second members 12, 13 which engage a component of a structure (e.g. surfaces 12B, 13F) may comprise lower friction elements (e.g. a slip sheet, a slip plate, low friction tape or membrane, etc.) which facilitate at least a partial slip engagement with the component of the structure without coupling mechanism 10 becoming uncoupled from the structural component. For example, one or both of the surfaces of first and second members 12, 13 may comprise a Teflon™ liner or the like. In some embodiments end 13B of second member 13 comprises a Teflon™ liner or the like. Surfaces 12B, 13F may be configured to have a length L that is sufficiently large to allow movement or slipping of surfaces 12B and/or 13F relative to the structural component without surfaces 12B and/or 13F becoming uncoupled from the structural component.

Figure 2A:
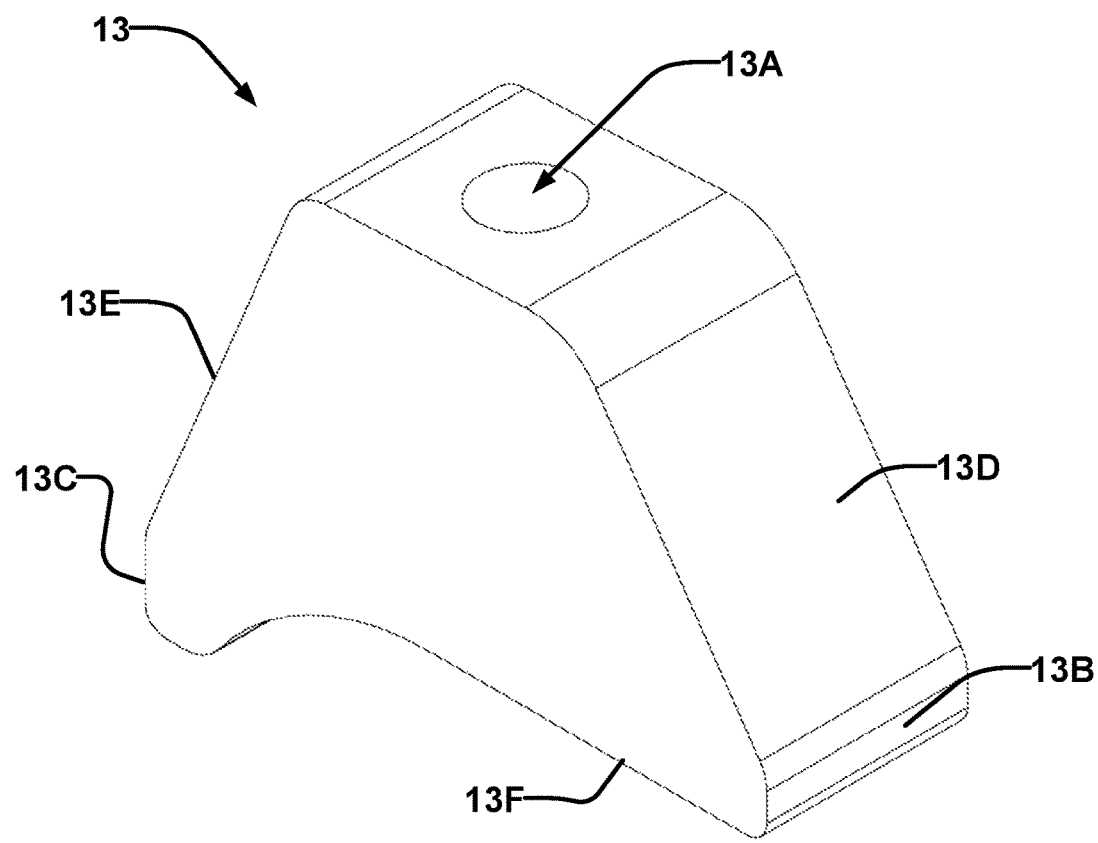
FIG. 2A is a perspective view of an example second member of the coupling mechanism of FIG. 1A.
Figure 2B:
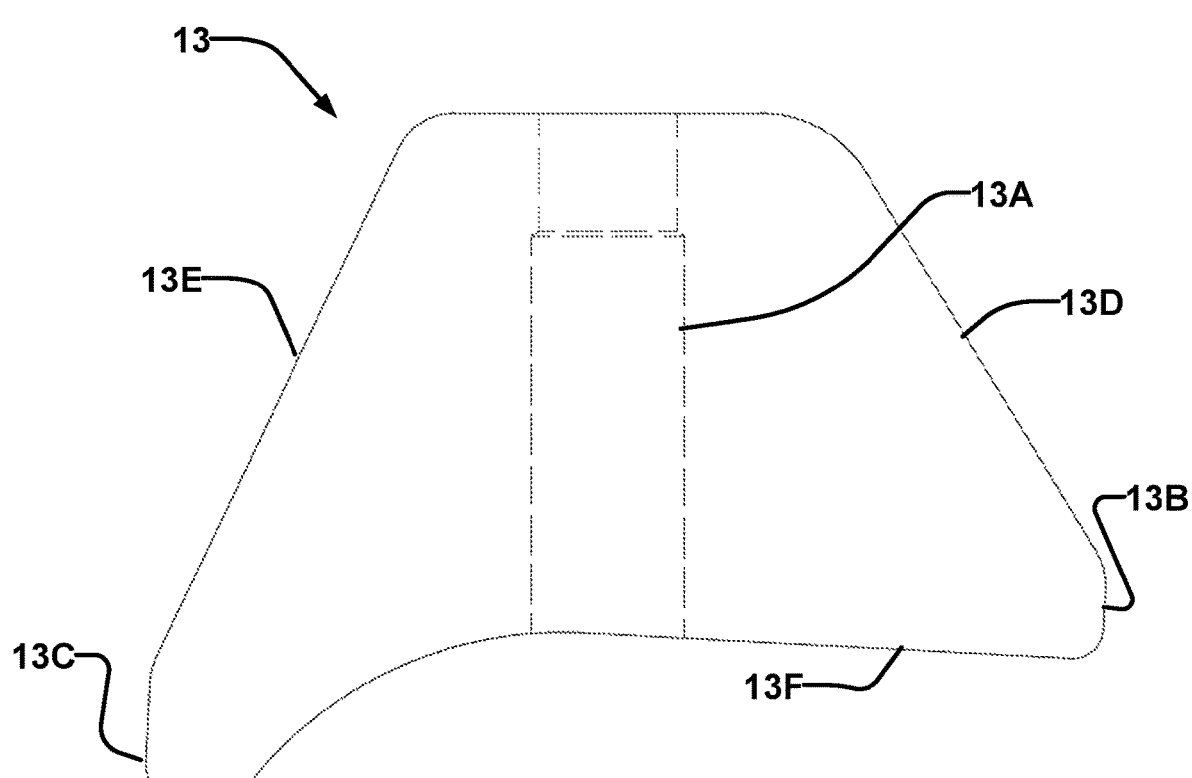
FIG. 2B is a front view of the second member of FIG. 2A.

FIG. 2A is a perspective view of an example second member 13. FIG. 2B is a front view of the example second member 13.

In some embodiments second member 13 may pivot relative to first member 12 about end 13C of second member 13.

In some embodiments second member 13 comprises one or more sloped surfaces (e.g. surfaces 13D and 13E). Such sloped surfaces may reduce a spatial footprint of second member 13 thereby enabling use of second member 13 within smaller spaces, reducing expense (e.g. reducing amount of material required) and/or the like.

In some embodiments second member 13 is talon-like. The talon-like shape may, for example, facilitate use of coupling mechanism 10 with a number of different structural components (e.g. the talon-like shape can sufficiently extend over a number of different sized structural components). Additionally, or alternatively, the talon-like shape may ensure that second member 13 is large enough to sufficiently extend over a structural component to ensure a proper coupling.

In some embodiments a lower surface 13F of second member 13 at least partially slopes downwards towards end 13B.

In some embodiments end 13B comprises a plurality of faceted surfaces. The faceted surfaces may assist end 13B with forming an engagement with (or gripping) a component of a structure.

In some embodiments end 13B and/or end 13C may be at least partially rounded or curved. Having ends 13B and/or 13C be rounded or curved may advantageously disperse forces exerted on ends 13B and/or 13C.

Figure 3A:
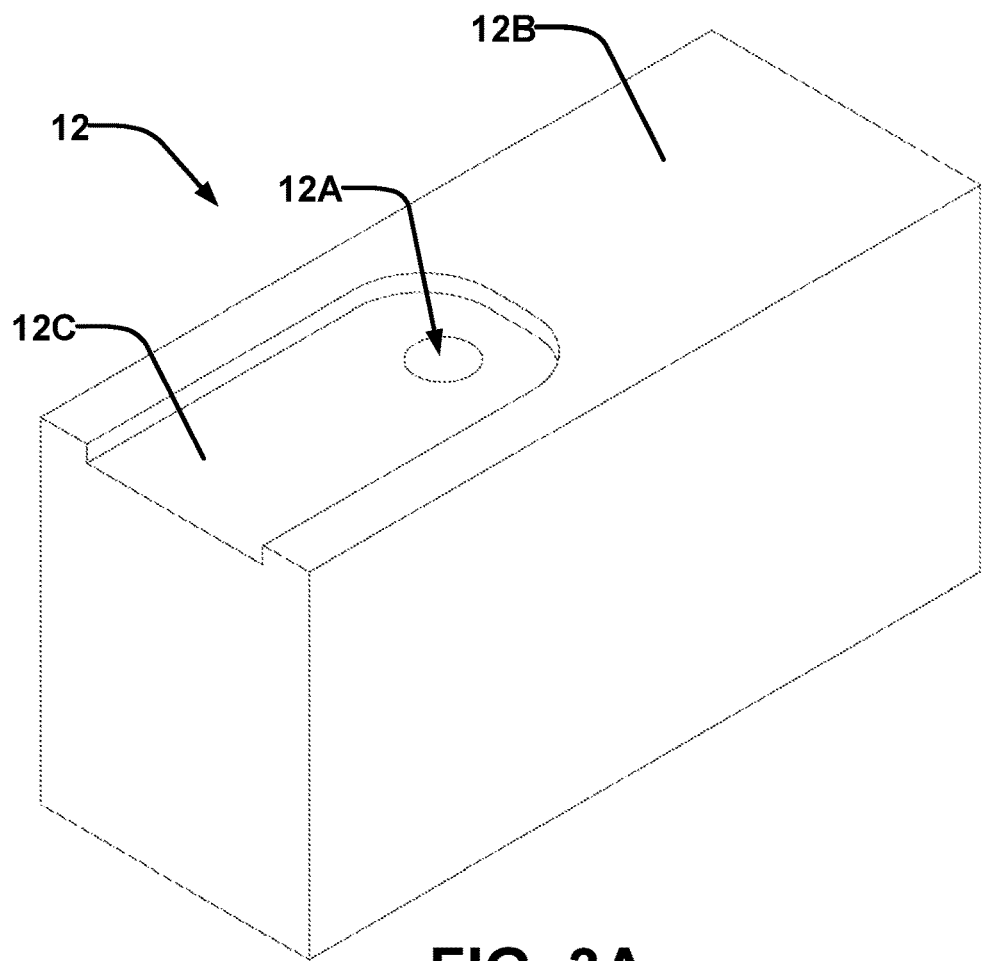
FIG. 3A is a perspective view of an example first member of the coupling mechanism of FIG. 1A.
Figure 3B:
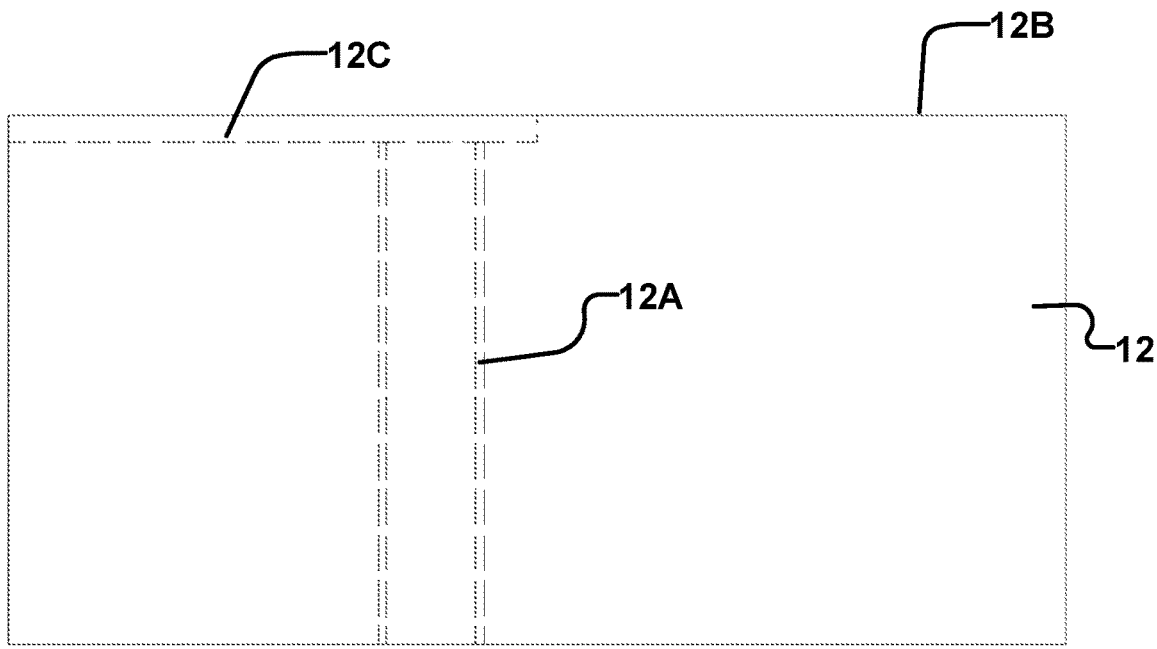
FIG. 3B is a front view of the first member of FIG. 3A.

FIG. 3A is a perspective view of an example first member 12. FIG. 3B is a front view of the example first member 12.

As shown in FIGS. 3A and 3B, first member 12 may comprise a slot 12C. Slot 12C may extend at least partially across an upper surface 12B of first member 12. End 13C of second member 13 may, for example, be received within slot 12C. Receiving end 13C of second member 13 within slot 12C may align second member 13 relative to first member 12. Additionally, or alternatively, slot 12C may prevent lateral pivoting or rotation (e.g. as illustrated in FIGS. 1A and 1B) of second member 13 about end 13C relative to first member 12. Additionally, or alternatively, slot 12C may prevent longer term lateral pivoting or rotation of second member 13 about end 13C relative to first member 12 once coupling mechanism 10 is installed due to, for example, vibrations or movement of the structure, forces exerted on the prefabricated panel and/or structure, etc. In some embodiments end 13C of second member 13 slipingly engages one or more walls of slot 12C.

In some embodiments first member 12 comprises a plurality of bores 12A. For example, a plurality of bores 12A may be aligned linearly along slot 12C. Having a plurality of bores 12A may accommodate a larger number of structural components. In some such cases, a technician may select which bore 12A to run fastener 14 through depending on a size of the structural component that is received within cavity 16.

In some embodiments first and/or second members 12, 13 are made of steel, aluminum, cast iron, a forged metal or another similar metal. In some embodiments first and/or second members 12, 13 are made of a material other than metal (e.g. fiberglass, carbon fiber, etc.).

Although second member 13 may be talon-like, second member 13 need not be talon-like and may have any profile. Non talon-like second members 13 may comprise any features described herein with respect to second member 13. For example, second member 13 may have a generally flat plate-like profile. A portion of the generally flat plate-like second member 13 may be configured to fit within slot 12C of first member 12.

A prefabricated panel may comprise plural coupling points at which the prefabricated panel is to be coupled to a structure. The prefabricated panel may comprise a first member 12 at each one of the coupling points. The prefabricated panel may be coupled to the structure by sufficiently tightening corresponding fasteners 14 such that components of the structure are clamped between first members 12 and corresponding second members 13 at the coupling points. The prefabricated panel may be uncoupled from the structure by untightening or releasing fasteners 14 thereby releasing second members 13 relative to first members 12.

Second members 13 and fasteners 14 may be pre-coupled to first members 12 of a prefabricated panel or may be shipped as separate components.

In some embodiments surface 12B of first member 12 is flush with a surface of a prefabricated panel to which the first member 12 is coupled to.

Figure 4A:
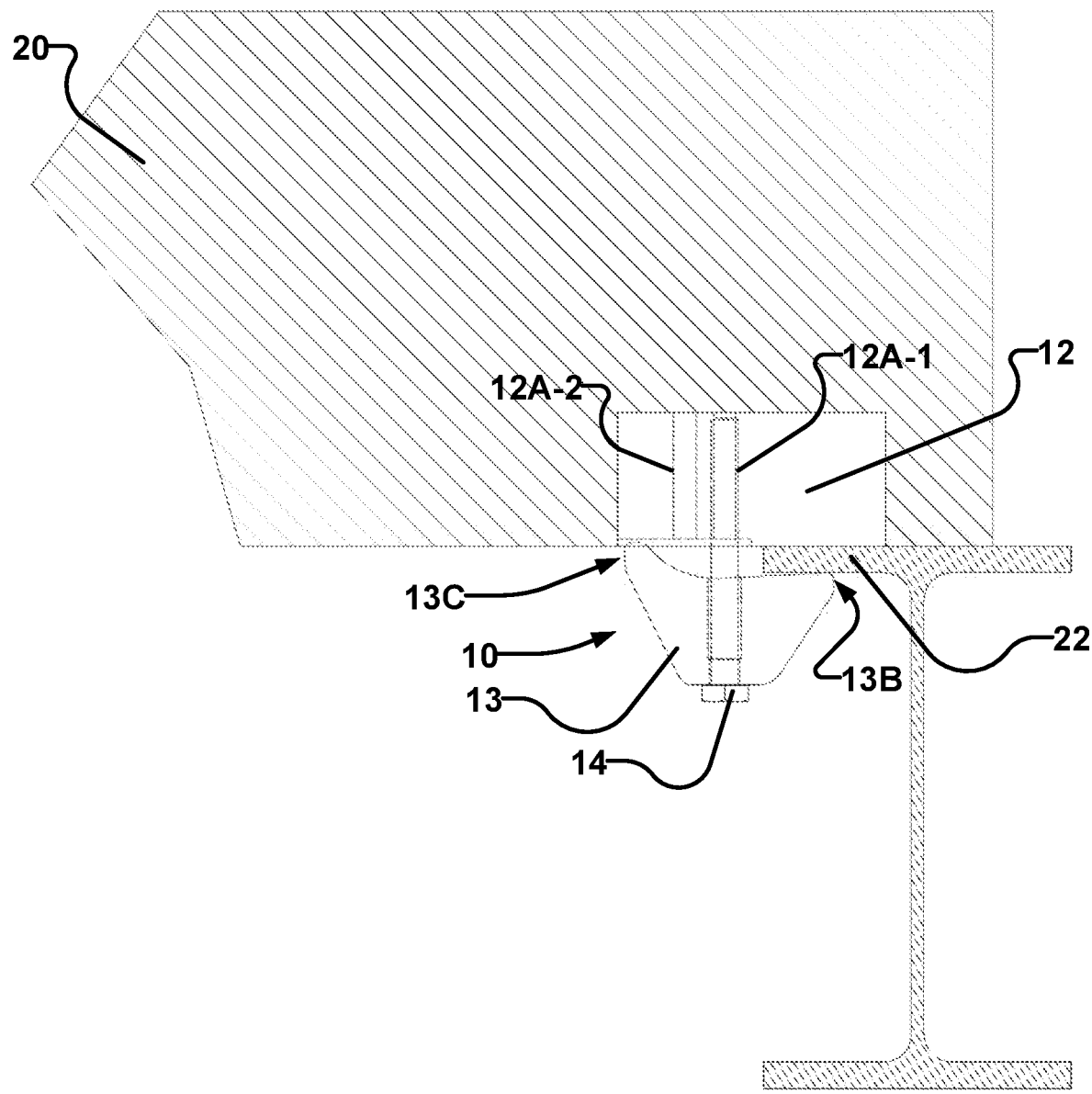
FIG. 4A is a schematic view of an example coupling of a prefabricated panel to a structural component.
Figure 4B:
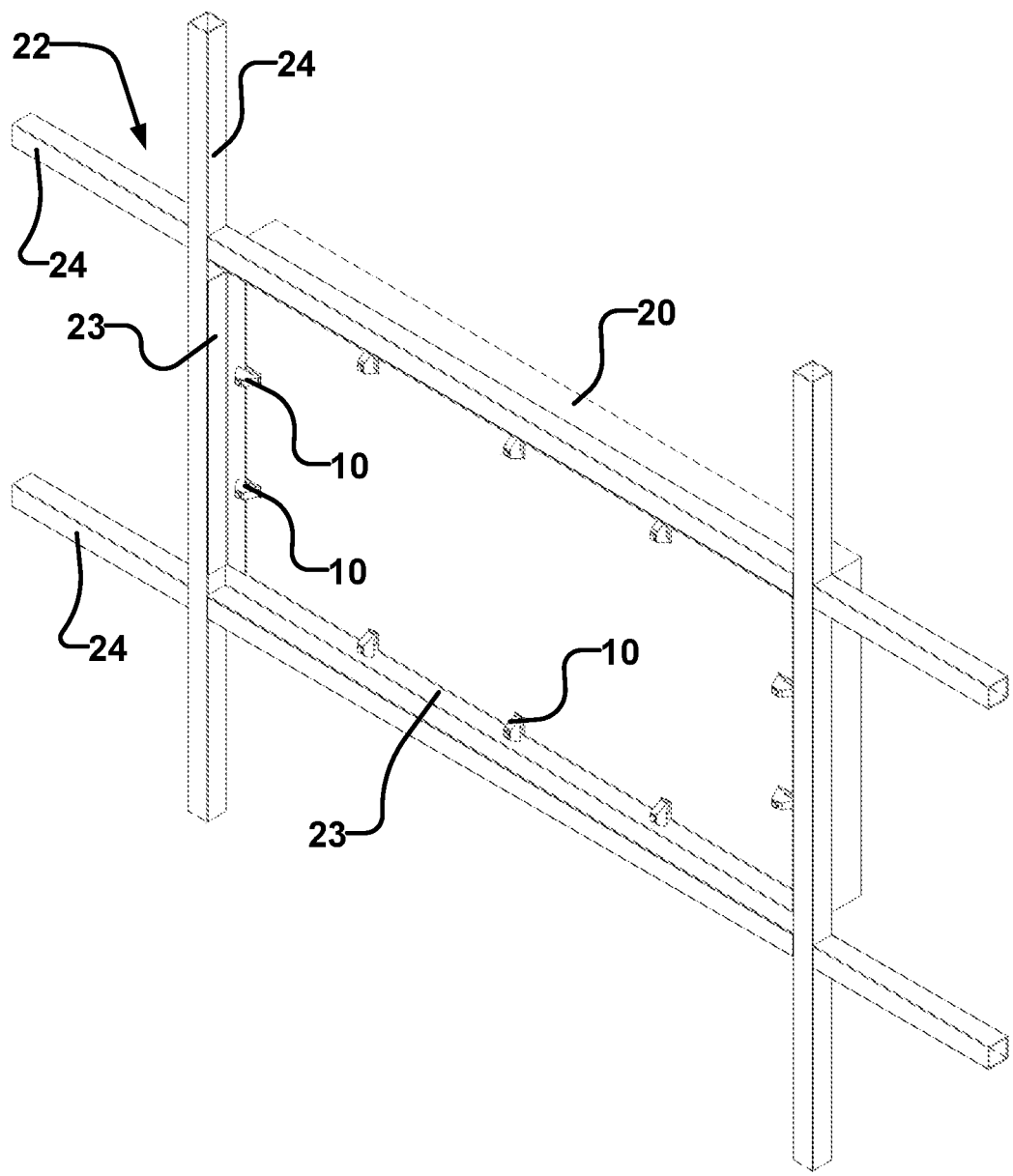
FIGS. 4B to 4E illustrate example couplings of prefabricated panels to structural components using the coupling mechanisms described herein.
Figure 4C:
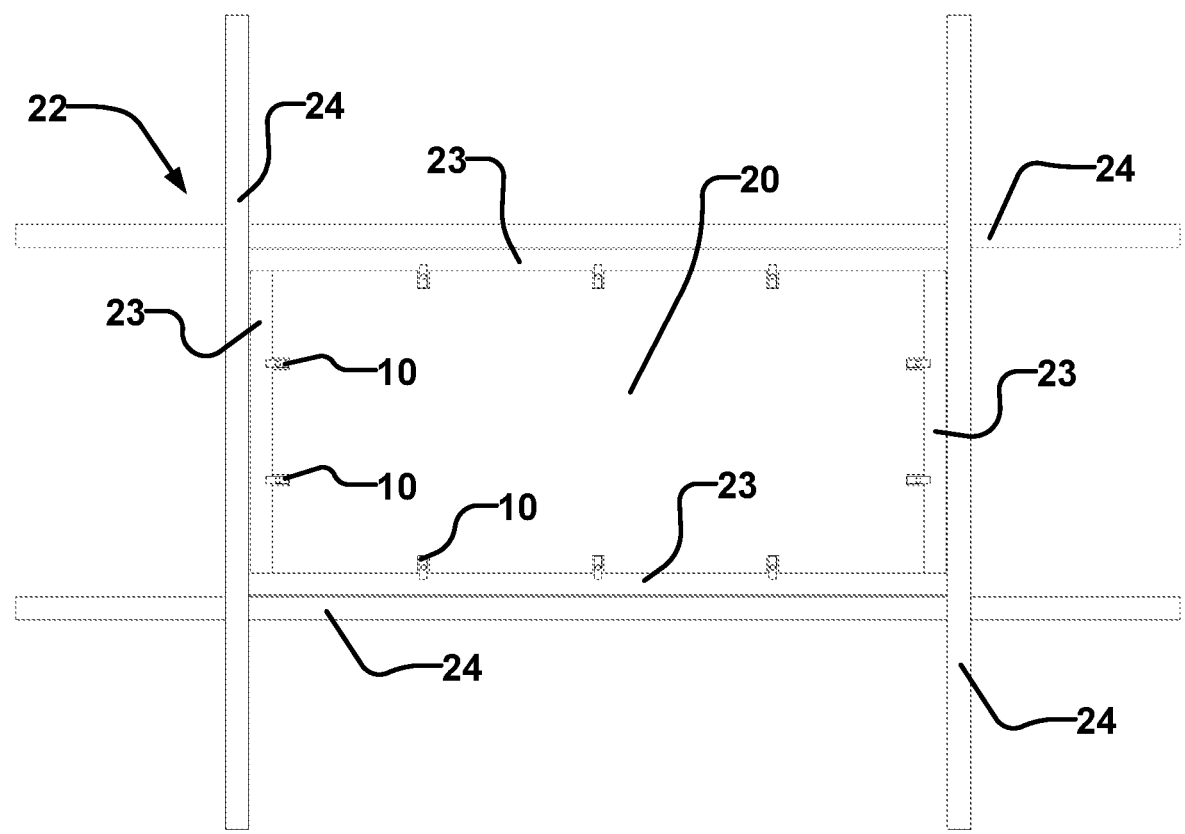

FIG. 4A illustrates an example coupling of a prefabricated panel 20 to a structural component 22 (an I-Beam in the illustrated example case) using coupling mechanism 10 described herein. As shown in FIG. 4A structural component 22 is engaged (e.g. clamped) between first and second members 12 and 13. Advantageously, first and second members 12 and 13 may engage inward portions of structural component 22. First and second members 12 and 13 are not limited to engaging edges (or edge portions) of structural component 22. In the example illustrated in FIG. 4A, first member 12 comprises plural bores 12A (e.g. bores 12A-1, 12A-2) as described elsewhere herein.

Figure 4D:
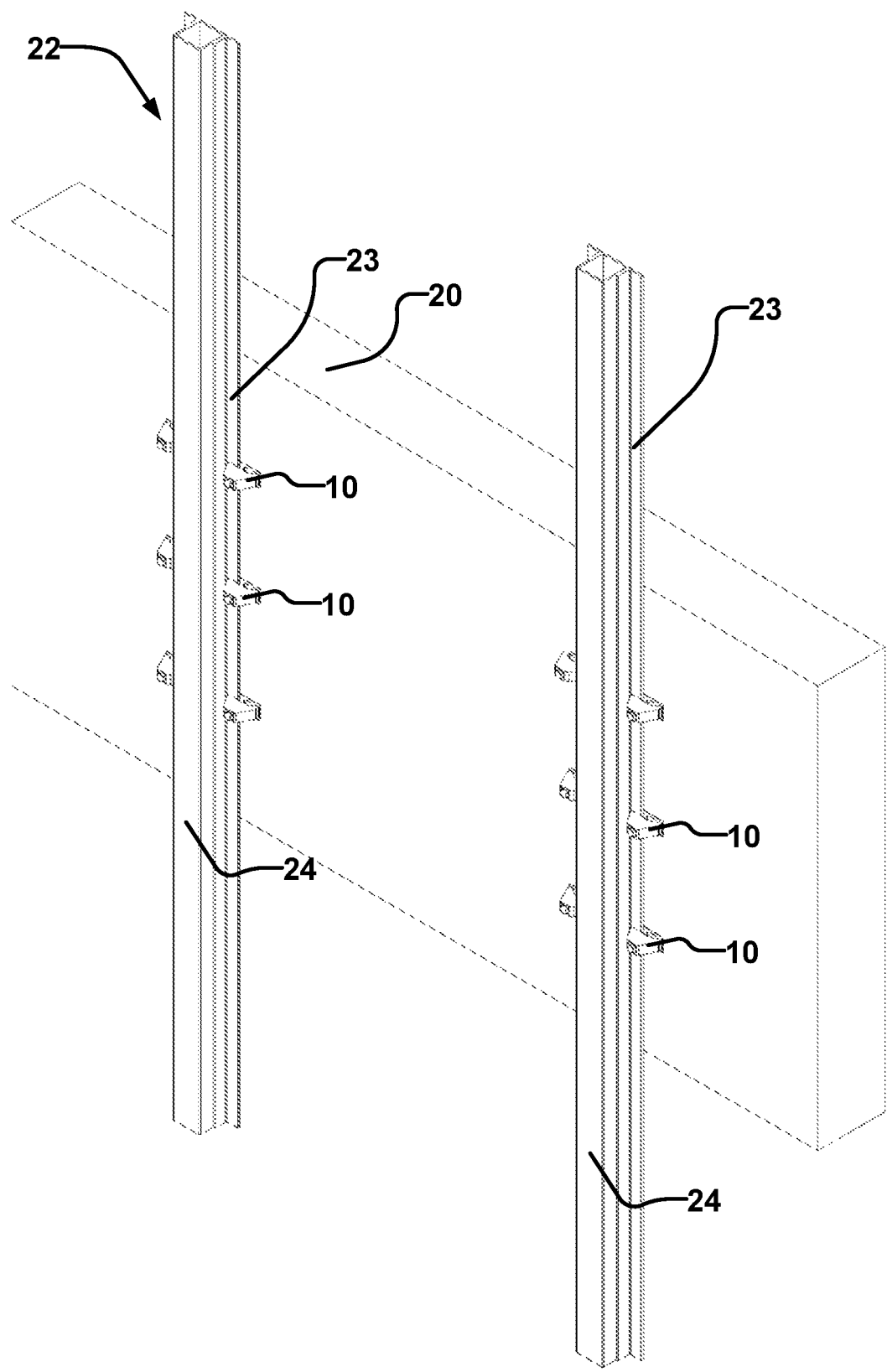
Figure 4E:
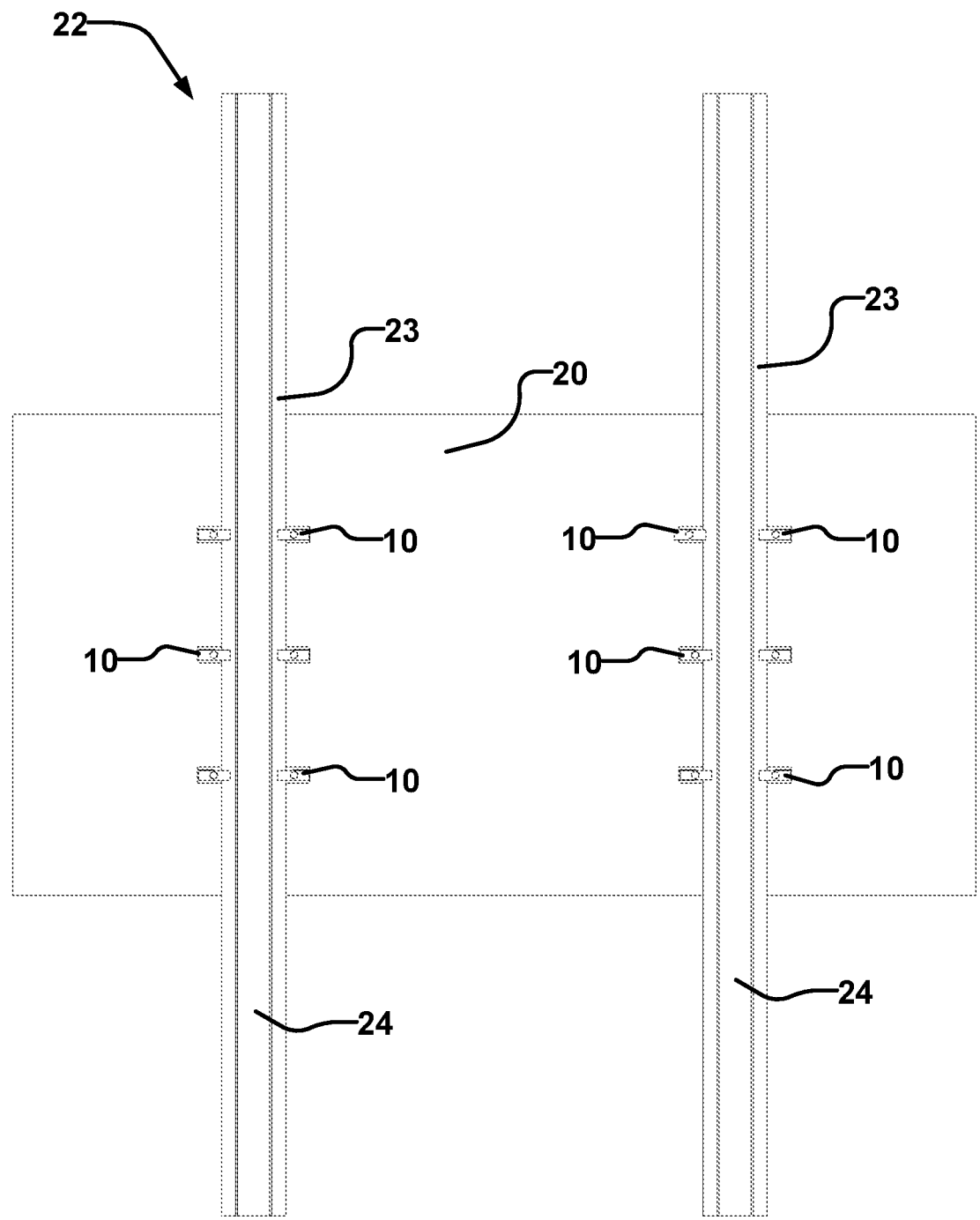

FIGS. 4B to 4E illustrate additional example couplings of prefabricated panels 20 to structural components 22. As shown in FIGS. 4B to 4E positioning of coupling mechanisms 10 may match the structural components 22 to which panels 20 will be coupled to. In the example shown in FIGS. 4B and 4C, coupling mechanisms 10 extend around a periphery of panel 20. In the example shown in FIGS. 4D and 4E, coupling mechanisms 10 are positioned vertically to match the vertical structural components 22 panel 20 will be coupled to. As shown in FIGS. 4D and 4E coupling mechanism 10 need not be positioned proximate to a peripheral edge of panel 20.

In the example cases illustrated by FIGS. 4B to 4E structural components 22 comprise flanges 23 coupled to structural beams 24.

Although coupling mechanisms 10 have been illustrated as being coupled to inner surfaces of panels 20 in FIGS. 4A to 4E, coupling mechanisms 10 may be coupled to any surface of a panel 20.

Figure 5A:
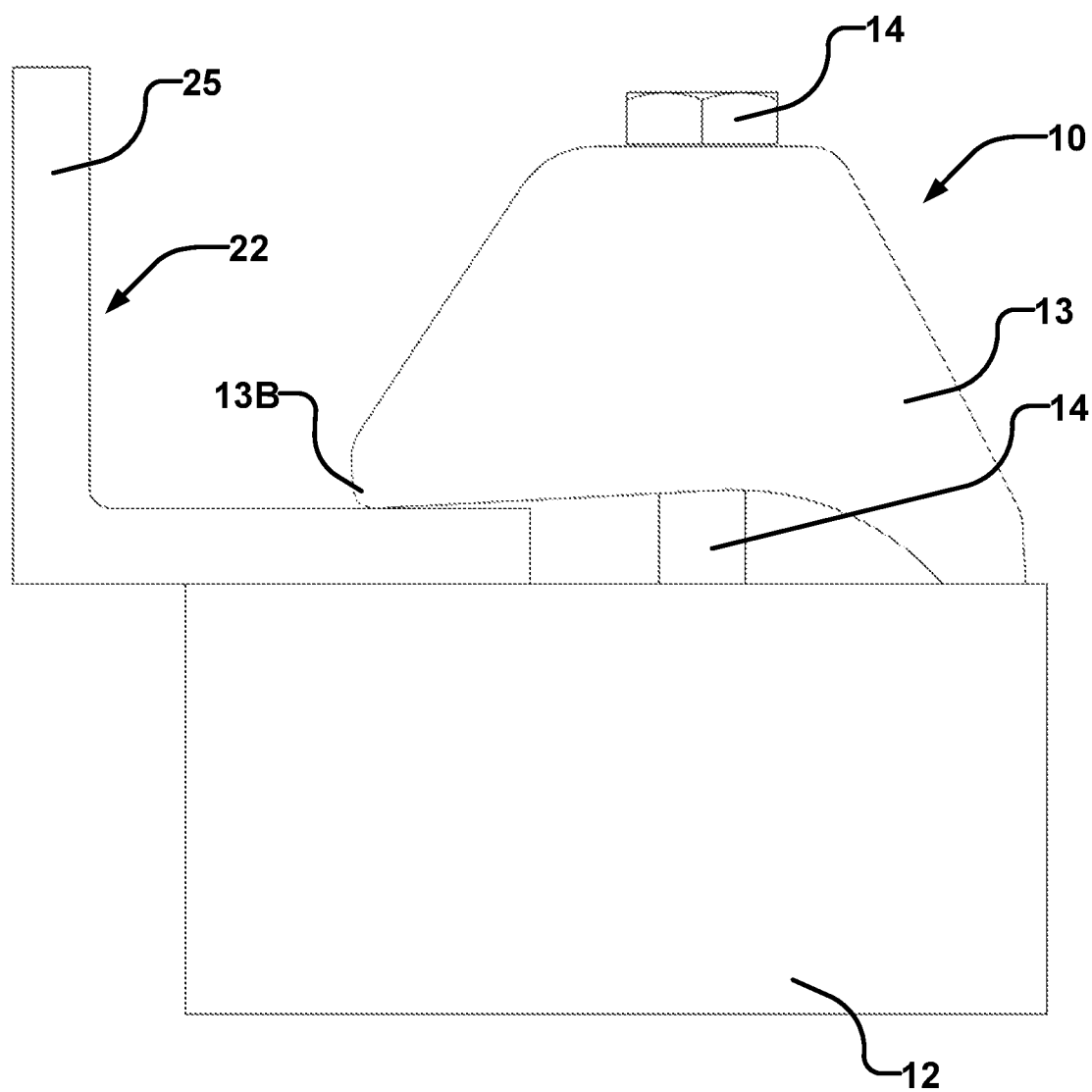
FIGS. 5A to 5D schematically illustrate example couplings of the coupling mechanism described herein to structural components having various profiles.
Figure 5B:
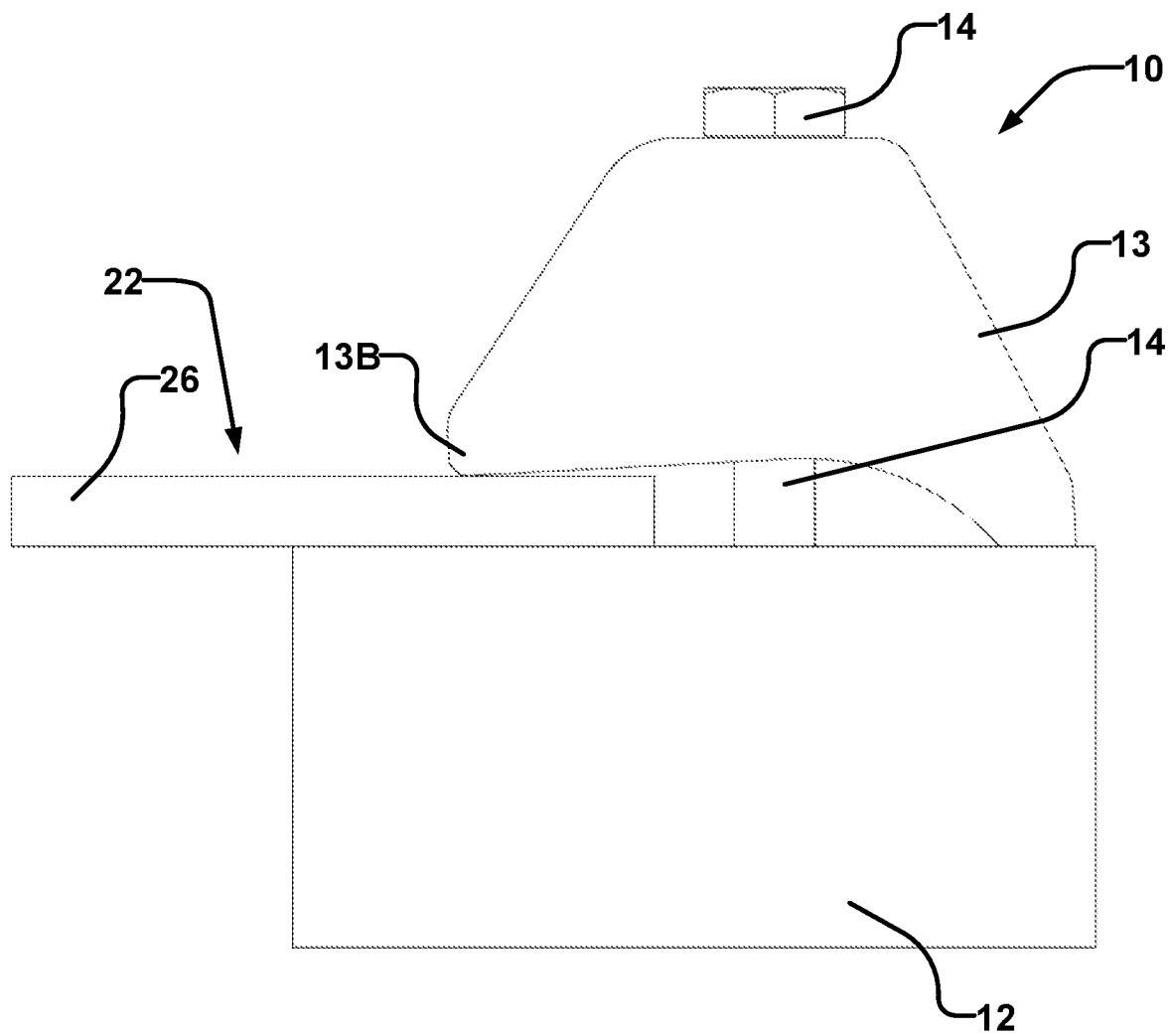
Figure 5C:
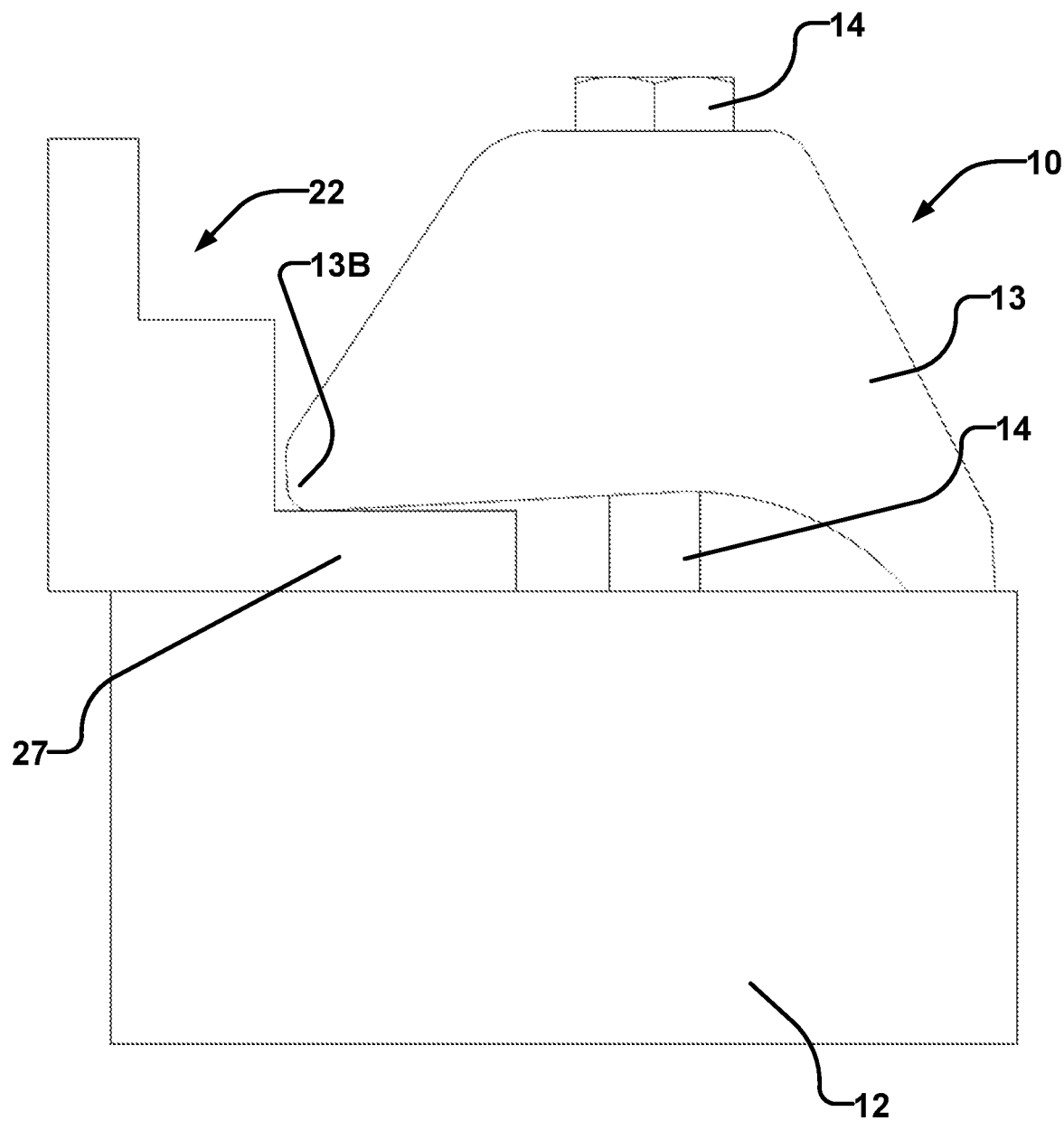
Figure 5D:
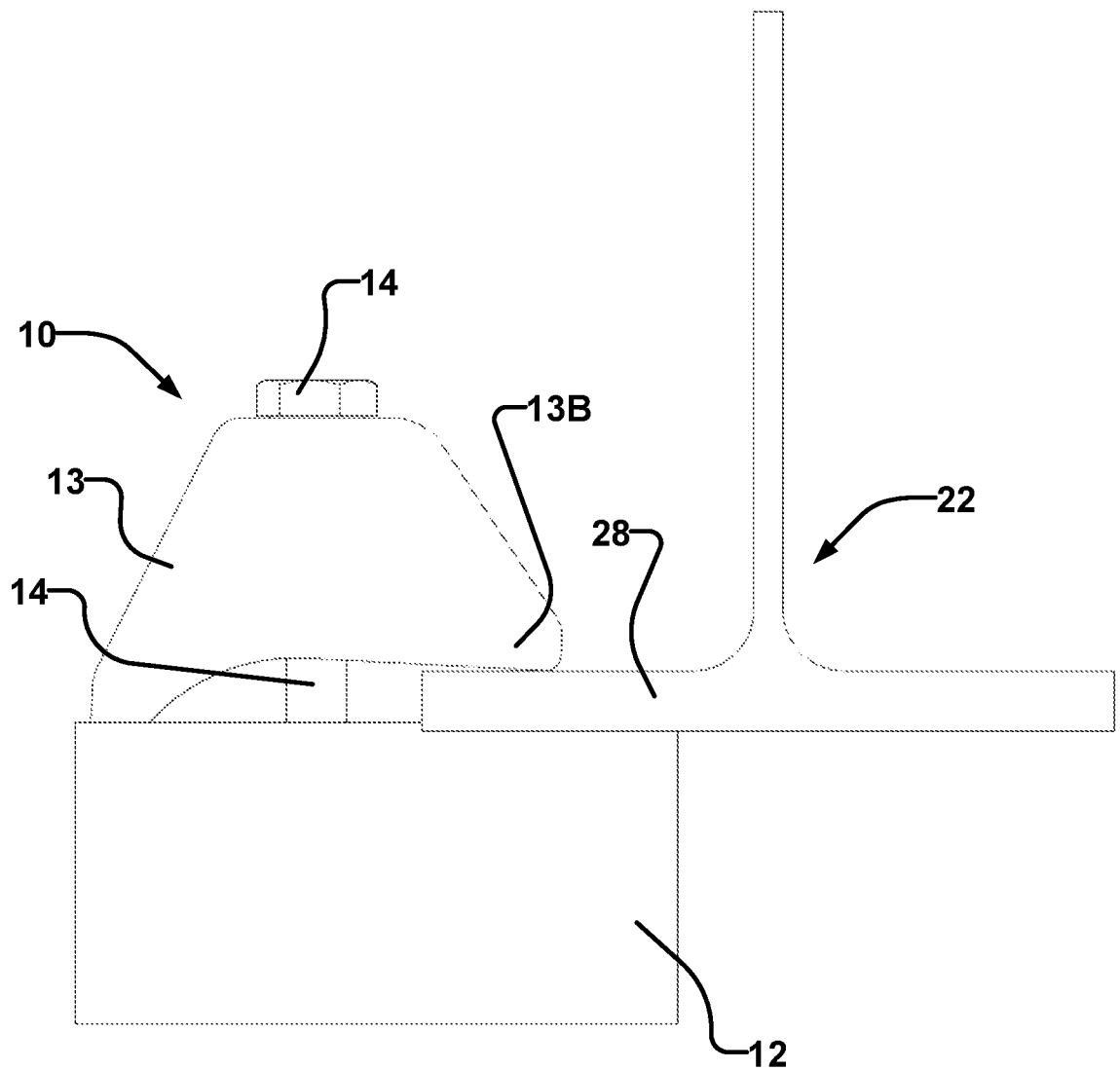

FIGS. 5A to 5D schematically illustrate example couplings of first and second members 12, 13 of coupling mechanism 10 to structural components 22 having various profiles. FIG. 5A illustrates structural component 22 comprising an example flange or angle bar component 25. FIG. 5B illustrates structural component 22 comprising an example plate 26. FIG. 5C illustrates structural component 22 comprising an example lip 27. FIG. 5D illustrates structural component 22 comprising an example I-beam 28.

In some embodiments fastener 14 is designed to break and release second member 13 from first member 12 if a force exerted on a prefabricated panel exceeds a threshold amount to protect a structure the panel was coupled to from being damaged.

Interpretation of Terms

Unless the context clearly requires otherwise, throughout the description and the claims:

"comprise", "comprising", and the like are to be construed in an inclusive sense, as opposed to an exclusive or exhaustive sense; that is to say, in the sense of "including, but not limited to";

"connected", "coupled", or any variant thereof, means any connection or coupling, either direct or indirect, between two or more elements; the coupling or connection between the elements can be physical, logical, or a combination thereof;

"herein", "above", "below", and words of similar import, when used to describe this specification, shall refer to this specification as a whole, and not to any particular portions of this specification;

"or", in reference to a list of two or more items, covers all of the following interpretations of the word: any of the items in the list, all of the items in the list, and any combination of the items in the list;

the singular forms "a", "an", and "the" also include the meaning of any appropriate plural forms.

Words that indicate directions such as "vertical", "transverse", "horizontal", "upward", "downward", "forward", "backward", "inward", "outward", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

For example, while processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

In addition, while elements are at times shown as being performed sequentially, they may instead be performed simultaneously or in different sequences. It is therefore intended that the following claims are interpreted to include all such variations as are within their intended scope.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

Various features are described herein as being present in "some embodiments". Such features are not mandatory and may not be present in all embodiments. Embodiments of the invention may include zero, any one or any combination of two or more of such features. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible).

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

What is claimed is:

1. A system for coupling a prefabricated panel to a structure, the system comprising:
   a first member;
   a second member, the second member movable relative to the first member; and
   a fastener, the fastener configured to bias the first and second members together such that a component of the structure is at least partially receivable between the first and second members and tightening the fastener reduces a distance between the first and second members,
   wherein the second member includes:
   a first surface;
   a second surface opposite the first surface, the second surface at least partially engageable with the component of the structure; and
   a bore defined within the second member and extending between the first and second surfaces, the bore configured to receive the fastener and
   wherein the bore of the second member includes plural diameters.

2. The system of claim 1 wherein the first member is couplable to a framing structure of the prefabricated panel.

3. The system of claim 1 wherein the second member is pivotable relative to the first member.

4. The system of claim 1 wherein a first end of the second member engages the component of the structure.

5. The system of claim 4 wherein the first end of the second member is at least partially rounded.

6. The system of claim 1 wherein the first and second members clamp the component of the structure.

7. The system of claim 6 wherein the first and second members frictionally engage the component of the structure.

8. The system of claim 6 wherein the first and second members slipingly engage the component of the structure.

9. The system of claim 8 wherein one or both of the first and second members comprises a friction element.

10. The system of claim 1 wherein the first member comprises a slot defined therein at least partially extending across a surface thereof, wherein a second end of the second member is received within the slot.

11. The system of claim 10 wherein the second end of the second member is at least partially rounded.

12. The system of claim 10 wherein the slot aligns the second member relative to the first member.

13. The system of claim 10 wherein the second end of the second member slipingly engages walls of the slot.

14. The system of claim 1 wherein at least a portion of the second surface extending between an end of the second member and the bore is sloped.

15. The system of claim 14 wherein at least a portion of the second surface extending between another end of the second member and the bore is curved.

16. The system of claim 1 wherein the shape of the second member is talon-like.

17. The system of claim 1 wherein the fastener comprises a self-tapping fastener.

18. The system of claim 1 wherein the first member comprises a plurality of bores each configured to receive the fastener.

19. The system of claim 18 wherein the bores of the plurality of bores of the first member are is aligned linearly.

20. A method for coupling a prefabricated panel to a structure, the method comprising:
    placing a component of the structure at least partially between a first member and a second member of a coupling mechanism, the first member of the coupling mechanism coupled to a framing structure of the prefabricated panel; and
    tightening a fastener which biases the first and second members together such that a distance between the first and second members decreases to clamp the component of the structure,
    wherein the second member includes:
    a first surface;

a second surface opposite the first surface, the second surface at least partially engageable with the component of the structure; and a bore defined within the second member and extending between the first and second surfaces, the bore configured to receive the fastener, wherein the bore of the second member includes plural diameters.

21. The method of claim 20 wherein the second member of the coupling mechanism is pivotable relative to the first member.

22. The method of claim 20 wherein the component structure includes inward portions and outward portions and wherein one or both of the first and second members of the coupling mechanism engage the inward portions of the component of the structure.

23. The method of claim 20 wherein the first and second members frictionally engage the component of the structure.

24. The method of claim 20 wherein the first and second members slipingly engage the component of the structure.

25. The method of claim 24 wherein an amount of slip may be varied by tightening or releasing the fastener.

26. A kit comprising:
a first member;
a second member, the second member movable relative to the first member; and
a fastener, the fastener operable to bias the first and second members together, wherein tightening the fastener reduces a distance between the first and second members to clamp a framing structure of a prefabricated panel therebetween,
wherein the second member includes:
a first surface;
a second surface opposite the first surface, the second surface at least partially engageable with a component of the structure; and
a bore defined within the second member and extending between the first and second surfaces, the bore configured to receive the fastener, wherein the bore of the second member includes plural diameters.

27. The kit of claim 26 wherein the second member is pivotable relative to the first member.

28. The kit of claim 26 wherein the first member is couplable to the framing structure of a prefabricated panel.

29. A kit comprising:
a second member, the second member movable relative to a first member coupled to a framing structure of a prefabricated panel; and
a fastener, the fastener operable to bias the first and second members together, wherein tightening the fastener reduces a distance between the first and second members to clamp the framing structure therebetween,
wherein the second member includes:
a first surface;
a second surface opposite the first surface, the second surface at least partially engageable with a component of the structure; and
a bore defined within the second member and extending between the first and second surfaces, the bore configured to receive the fastener, wherein the bore of the second member includes plural diameters.

30. The kit of claim 29 wherein the second member is pivotable relative to the first member.

* * * * *